United States Patent
Hossain et al.

(10) Patent No.: US 12,186,776 B2
(45) Date of Patent: Jan. 7, 2025

(54) METHOD FOR PRODUCING A CARRIER LAYER WITH A HYDROPHILIC POLYMERIC NANOCOATING

(71) Applicant: Sefar AG, Heiden (CH)

(72) Inventors: Mohammad Mokbul Hossain, Heiden (CH); Christoph Ellenberger, Kriessern (CH); Matteo Camani, Arbon (CH); Karim Chakhari, St. Gallen (CH)

(73) Assignee: Sefar AG, Heiden (CH)

( * ) Notice: Subject to any disclaimer, the term of this patent is extended or adjusted under 35 U.S.C. 154(b) by 0 days.

(21) Appl. No.: 17/723,406

(22) Filed: Apr. 18, 2022

(65) Prior Publication Data

US 2022/0371050 A1 Nov. 24, 2022

(30) Foreign Application Priority Data

May 18, 2021 (EP) .................................. 21174477

(51) Int. Cl.
| | |
|---|---|
| *B05D 3/04* | (2006.01) |
| *D04H 1/42* | (2012.01) |
| *D04H 1/728* | (2012.01) |
| *D04H 3/016* | (2012.01) |
| *D04H 13/00* | (2006.01) |
| *B82Y 30/00* | (2011.01) |

(52) U.S. Cl.
CPC ............ *B05D 3/0446* (2013.01); *D04H 1/42* (2013.01); *D04H 1/728* (2013.01); *D04H 3/016* (2013.01); *D04H 13/002* (2013.01); *B82Y 30/00* (2013.01)

(58) Field of Classification Search
CPC ......... B05D 3/0446; D04H 1/42; D04H 1/728
See application file for complete search history.

(56) References Cited

U.S. PATENT DOCUMENTS

| | | | |
|---|---|---|---|
| 2008/0220676 A1 | 9/2008 | Marin et al. | |
| 2010/0024643 A1* | 2/2010 | Bradley | ............. B01D 39/2055 |
| | | | 128/205.27 |
| 2010/0136865 A1 | 6/2010 | Bletsos | |
| 2011/0177741 A1 | 7/2011 | Bryner | |

(Continued)

FOREIGN PATENT DOCUMENTS

| | | |
|---|---|---|
| EP | 3320986 A1 | 5/2018 |
| JP | 2018-523588 A | 8/2018 |

(Continued)

OTHER PUBLICATIONS

Yang, Yao-Yao, et al., "pH-sensitive polymer nanocoating on hydrophilic composites fabricated using modified coaxial electrospraying". Materials Letters 727 (2018) 93-96.*

(Continued)

*Primary Examiner* — Bret P Chen
(74) *Attorney, Agent, or Firm* — Studebaker & Brackett PC

(57) ABSTRACT

A method for producing a carrier layer with a hydrophilic polymeric nanocoating wherein a polymeric carrier layer is produced with filaments of polymer material(s). The hydrophilic polymer nanocoating is applied with a low pressure plasma polymerization process using organic precursor monomers deposited onto the polymeric carrier layer and/or composite membrane. Additionally, a carrier layer includes a polymeric hydrophilic nanocoating.

12 Claims, 2 Drawing Sheets

(56) References Cited

U.S. PATENT DOCUMENTS

| | | | |
|---|---|---|---|
| 2013/0197664 A1 | 8/2013 | Ballard et al. | |
| 2014/0060330 A1 | 3/2014 | Boyat et al. | |
| 2014/0072608 A1* | 3/2014 | Logothetidis | A61L 27/58 427/2.24 |
| 2015/0148269 A1* | 5/2015 | Tamsilian | C09K 8/588 507/225 |
| 2018/0046223 A1 | 2/2018 | Hossain et al. | |
| 2018/0078000 A1* | 3/2018 | Legein | A43D 95/06 |

FOREIGN PATENT DOCUMENTS

| | | | |
|---|---|---|---|
| JP | 2020-512479 A | 4/2020 | |
| KR | 10-0828477 * | 5/2008 | B82B 3/00 |
| WO | 2006/131081 A1 | 12/2006 | |
| WO | WO 2007/083124 A1 * | 7/2007 | D06M 10/00 |
| WO | 2008/106903 A2 | 9/2008 | |
| WO | 2013/043397 A2 | 3/2013 | |
| WO | 2017/129418 A1 | 8/2017 | |

OTHER PUBLICATIONS

Chen, Dengyue, et al., "Continuous Polymer Nanocoating on Silica Nanoparticles". Langmuir, 2014, 7804-7810.*

Vrignaud, Sandy, et al., "Strategies for the nanoencapsulation of hydrophilic molecules in polymer-based nanoparticles". Biomaterials, vol. 32, Issue 33, Nov. 2011, pp. 8593-8604.*

Kobayashi, Motoyasu, et al., "Applications of Polymer Brushes to Structural Nano-Coatings". 2011 IEEE Nanotechnology Materials and Devices Conference Oct. 18-21, 2011, Jeju, Korea, pp. 69-74.*

Yilmaz, Kurtulus, et al., "Vapor Deposition of Transparent Antifogging Polymeric Nanocoatings". Langmuir, 2021, 37, 1941-1947.*

Su, P. et al., "Vapor deposition of ultrathin hydrophilic polymer coatings enabling candle soot composite for highly sensitive humidity sensors". Materials Today Chemistry, 24 (2022) 100786, pp. 1-10.*

Das, Sonalee, et al., "A Review on Superhydrophobic Polymer Nanocoatings: Recent Development and Applications". Industrial & Engineering Chemistry Review, 2018, 57, 2727-2745.*

Zhang, Xu, et al., "Fabrication of porous polymer coating layers with selective wettability on filter papers via the breath figure method and their applications in oil/water separation". RSC Advances, 2021, 11, 14276-14284.*

An Office Action mailed by the Japanese Patent Office on Apr. 25, 2023, which corresponds to Japanese Patent Application No. 2022-077398 and is related to U.S. Appl. No. 17/723,406; with English language translation.

The extended European search report issued by the European Patent Office on Oct. 27, 2021, which corresponds to European Patent Application No. 21174477.6-1107.

* cited by examiner

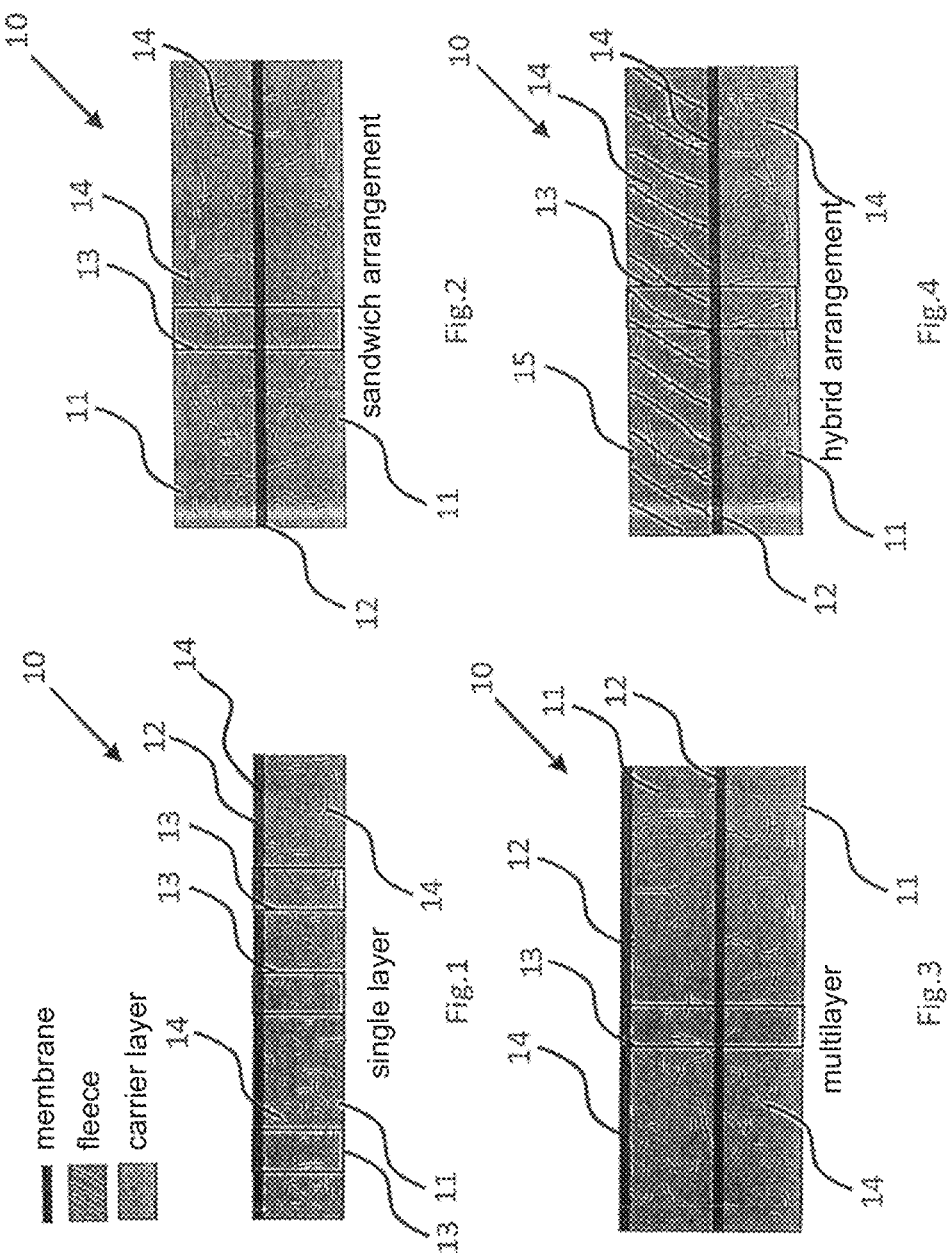

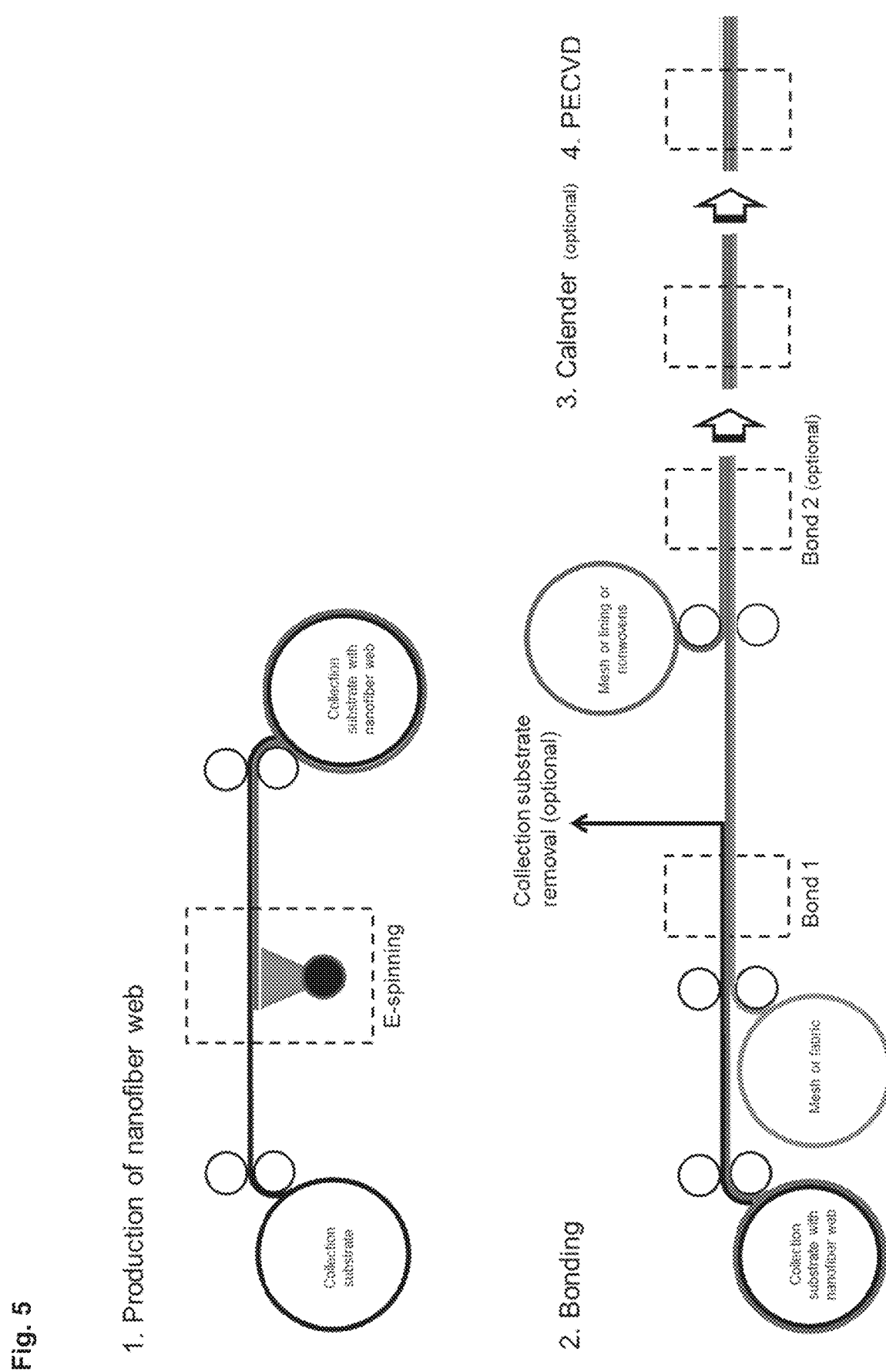

METHOD FOR PRODUCING A CARRIER LAYER WITH A HYDROPHILIC POLYMERIC NANOCOATING

The invention relates to a method for producing a carrier layer with a hydrophilic polymeric nanocoating.

Furthermore, the invention relates to a carrier layer with a polymeric hydrophilic nanocoating being produced according to the inventive method.

In the advancing technological development in thin film technology, there is a continuing need to develop a chemical vapor deposition process to prepare thin films of permanent hydrophilic functional groups, which exhibit unique functional properties e.g. for potential medical applications. The lack of the proper volatile precursors and the difficulty in composition control in coating are the major barriers to sluggish the achievement of this purpose.

A generic composite membrane and a method for the production thereof can be taken from US 2011/0177741 A1. A non-woven textile with a carrier layer and a barrier layer that are both composed of fibers is described.

From US 2008/0220676 A1 a garment having a fabric layer and a layer of coated nanofibers can be taken. Initially, the layer of nanofibers is produced which is subsequently provided with a liquid coating. Afterwards, the fiber layer and thus coated is joined to a fabric layer.

US 2010/0136865 A1 relates to a non-woven web of coated nanofibers.

A composite textile for a garment having an inner fabric layer, an outer fabric layer and a barrier layer consisting of a non-woven membrane of fibers can be taken from WO 2013/043397 A2. The fiber membrane is provided with a plasma coating before being joined to the fabric layers.

US 2013/0197664 A1 describes a filter medium with an electrospun membrane which is applied to a support structure. The support structure can consist of metal, ceramics, fiberglass, graphite or a polymer material.

An acoustic component with a microporous membrane for electronic devices can be gathered from US 2014/0060330 A1. The acoustic component has a microporous membrane layer, to which a layer of fine fibers is applied. Here the microporous membrane layer serves as a supporting layer.

The invention is based on the object to provide a robust and reliable method for manufacturing permanent hydrophilic fabrics and/or composite membranes for hygienic applications such as medical, healthcare, food in a cost-effective way.

According to the invention the object is achieved on the one hand by a method for producing a carrier layer with a hydrophilic polymeric nanocoating and by a carrier layer with a polymeric hydrophilic nanocoating.

Preferred embodiments of the invention are stated in the respective dependent claims.

The method according to the invention is characterized in that a polymeric carrier layer is produced with filaments of polymer material(s), wherein the hydrophilic polymer nanocoating is applied by means of a low pressure plasma polymerization process using organic precursor monomers onto the polymeric carrier layer.

Furthermore, the carrier layer according to the invention is characterized with a polymeric hydrophilic nanocoating being produced according to the inventive method and forming a composite membrane, and a polymeric hydrophilic nanocoating is applied on the carrier layer and/or the composite membrane.

A basic idea of the invention resides in the fact that the hydrophilic polymer nanocoating on fabrics is produced by a plasma treatment method, in detail a plasma enhanced chemical vapor deposition (PECVD). It therefore differs from other thin films in particular by a highly cross-linked polymer network having functional groups incorporated into the network, thus a high long-term stability of the modified surface can be obtained.

Further the bulk structure of plasma polymers—deposited by plasma enhanced chemical vapor deposition—is completely irregular, far from that of conventional polymers. Plasma polymer coating like the inventive nanocoating differs from conventional polymer by a high density of functional groups per volume, a highly crosslinked and branched plasma polymer network, a only nanometer thick coating (<100 nm), a high adhesion of coating to the substrate, and no change of bulk properties of the substrate.

The retention of functional groups in the resulting plasma polymer during plasma polymerization is one of the key challenges to obtain high degree of wettability. Thus, new unique properties can be introduced to the polymeric substrate materials such as fabrics and composite membranes.

Preferably at least one membrane layer with a pore structure is provided, wherein the membrane layer being produced by electrospinning of fibers being superimposed and a bonding is provided that connects the carrier layer and the membrane layer forming a composite membrane, wherein the hydrophilic polymer nanocoating is applied by means of the low pressure plasma polymerization process using organic precursor monomers onto the polymeric carrier layer and the at least one membrane. Thereby it is possible to provide further characteristics to the carrier layer due to the additional at least one membrane layer. An example for these characteristics may be a very fine structure which may be used for filtration applications.

The plasma treatment may be performed in a plasma chamber having a plurality of rollers and/or expanders in a roll to roll system which operates with a radiofrequency, preferably of about 13.56 MHz. The chamber further comprises a first electrode set and a second electrode set, and the carrier layer and/or the composite membrane are placed between first and second electrode sets, thereby having treatment on both sides of the substrate.

In an embodiment a pre-treatment is performed for a first time period, preferably of from about 2 minutes to about 5 minutes, at a first base pressure, preferably of from about 70 mTorr to about 150 mTorr, at a first temperature, preferably of from about 20° C. up to about 60° C., with a first power output, preferably of from about 500 Watts to about 1800 Watts. Subsequently the coating step is performed for a second time period, preferably of from about 2 minutes to about 5 minutes, at a second base pressure, preferably of from about 15 mTorr to about 100 mTorr, at a second temperature, preferably of from about 20° C. up to about 60° C., with a second power output, preferably of from about 100 Watts to about 800 Watts.

The surface of the substrate i.e. the carrier layer and/or the composite membrane can be chemically and/or morphologically modified prior to the deposition of functional layer. This is done by the pre-treatment. As a result, the plasma-polymer can adhere particularly firmly to the substrate during plasma polymerization i.e. the coating step.

Preferably an inlet system over the plasma chamber width is used to distribute gases and monomer vapour evenly into the plasma chamber, having mass flow controllers for gases for plasma activation (pre-treatment) and a monomer vapor supply system for liquid monomer for deposition of the nanocoating.

In an embodiment the plasma treatment is carried out onto the substrate under defined conditions, wherein the nanocoating as a functional layer is produced with chemical functional groups selected from the group consisting of hydroxyl groups, carbonyl groups, carboxyl groups, amino groups and mixtures thereof using monomer vapor consisting of a monomer or a mixture of monomer and helium or argon. These proposed groups are suitable for long-term coating stability. It is furthermore advantageous that the functional layer is formed without an additional tempering step or post treatment step. Nonpolymerizable gases and/gaseous mixture of argon, oxygen and helium can be used to activate and clean the substrate surface.

It is possible that the nanocoating is deposited in one processing step and/or two processing steps being temporally offset in which first coating step is used as an adhesion layer and second coating step as functional layer having a layer thickness of preferably 10 to 80 nm. Thereby in the first step, the surface activation and cleaning can be carried out to promote adhesion using non-polymerisable gases such as argon, oxygen and in the second step, a subsequent deposition of nanothin films is carried out using a polymerizable gas and/gaseous mixture of polymerizable gas/non-polymerizable gases. As a result, the functional layer may contain mono and/bi-functional hydrophilic groups.

Further a pre-treatment of the carrier layer and/or the composite membrane may be performed using argon, helium, nitrogen and oxygen and combinations thereof prior to deposition of adhesion layer and/or functional layer. Nonpolymerizable gases and/gaseous mixture of argon, oxygen and helium are thereby used to activate and clean the substrate surface.

Generally, the pre-treatment, the adhesion layer and the functional layer may be produced in the same step or in three separate steps being temporally offset.

The carrier layer and/or the composite membrane may further be treated with argon, helium, nitrogen and/or hydrogen under defined conditions, wherein plasma being temporally offset after each processing step.

In one embodiment the hydrophilic nanocoating is applied e.g. in a treatment time of around 4 minutes or less (per each processing step) on the carrier layer and/or composite membrane so that resistance against accelerated aging treatments according to ASTM F1980-16 is increased, and liquid transport, wicking and liquid throughput in filtration are improved and/or surface tension with a water contact angle from 0° (complete wetting) to 60° (moderate wet-ting) is provided.

The modified surface properties such as wettability and topographical changes etc. were examined by contact angle measurements and Scanning Electron Microscope (SEM), respectively. The determination of static contact angles on fabrics enabled the characterization of the wettability, and of the degree of hydrophilicity of textiles. The coating permanency i.e. self-life of coatings was investigated using accelerated aging test according to ASTM F1980-16.

Any material may be used for the carrier layer. However it is preferred if a woven mesh is used as the carrier layer with filaments of the same polymeric material or with at least two filaments, a first filament being made with a first polymer material and a second filament being made with a second polymer material, which is different to the first polymer material.

The woven mesh may be weaved with different patterns using the first filament and the second filament, wherein the first and second filaments can be produced in any cross-sectional shape or geometrical arrangement or pattern.

The mesh can be weaved with different patterns to obtain maximum wettability and thus a super hydrophilic surface with water contact angle zero can be obtained. The degree of plasma-induced hydrophilization is closely linked to the textile structure and the weave construction. The penetration of plasma species into the textile structure enables higher wettability. Thus, the wettability of substrate depends on the arrangement of both weft and warp filament in fabric, the fineness of the ultimate filament, the fabric density and weave structure and/or the fiber content.

Preferably the membrane layer is directly produced by electrospinning onto the carrier layer and/or the membrane layer is produced on a different carrier substrate by electrospinning which is then transferred onto the carrier layer by a lamination process for bonding.

In a preferred embodiment of a filtration media e.g. the composite membrane according to the invention is that the plasma treatment is done using low pressure plasma (cold plasma) using PECVD method suitable for temperature sensitive polymeric materials such as monofilament mesh.

The invention also relates to a carrier layer with a polymeric hydrophilic nanocoating being produced according to the inventive method comprising optionally a composite membrane, and wherein a polymeric hydrophilic nanocoating is applied on the carrier layer and/or the composite membrane.

Based on the invention it is possible to provide a high speed liquid transport through coated filter media like a composite membrane, a scalable high throughput liquid filtration (high filtration efficiency), biocompatible coating, robust and reliable coating method, an environmentally friendly and cleaned process suitable for high end applications like medical, healthcare, food etc. and/or a high consistency and high efficient process at low or no disposal costs.

In the following the invention is described further by way of a preferred exemplary embodiment illustrated schematically in the accompanying drawings, wherein show:

FIG. 1 a schematic cross-sectional illustration of a composite according to the invention in its simplest embodiment ("single layer");

FIG. 2 a schematic cross-sectional illustration of the composite according to the invention in the so-called "sandwich" arrangement;

FIG. 3 a schematic cross-sectional illustration of the composite according to the invention with a multilayer structure ("multilayer");

FIG. 4 a schematic cross-sectional illustration of the composite according to the invention in a "hybrid" arrangement with two different carrier layers; and FIG. 5 shows a schematic drawing of a preferred method according to the invention.

FIG. 1 shows a cross-sectional view of a composite 10 with a carrier layer 11. On the carrier layer 11 a membrane 12 is arranged that is formed according to the electrospinning method and applied onto the carrier layer 11. For an improved adherence of the membrane 12 to the carrier layer 11 the composite can be designed with at least one joining point 13 that firmly joins both layers to each other. This can be a melted or adhesive bonding location in the form of dots or lines. Due to the small layer thicknesses of the carrier material 11 and the membrane 12 the composite can be penetrated completely by the joining point 13 at the joining location.

The composite 10, more particularly the electrospun membrane 12, can be formed with a porosity. The surface of the composite 10 and the fibers of the pores can be coated with a coating that is applied according to the plasma coating method in particular. The surface coating of the fibers is illustrated schematically in the Figures by the depicted dots and lines 14. According to the invention the composite 10 can be completely surface-coated with the plasma polymer. This can also comprise fibers in a region in the pores of the membrane 12, which is positioned internally or deeper in the composite 10. Hence, not only the macroscopic external surface of the composite can be coated but also the microscopic internal surface, i.e. for instance single fibers, recesses and uneven parts.

FIG. 2 shows the composite 10 according to the invention in a so-called "sandwich" arrangement. In this, the membrane 12 is arranged between two carrier layers 11, whereby the membrane 12 is protected between the layers against mechanical stress in particular. In an embodiment of the sandwich arrangement an air permeability of 15.6 $l/m^2 \cdot s$ @200 Pa could be attained for example. Basically, an air permeability of up to 80 $l/m^2 \cdot s$ @200 Pa can also be reached with the sandwich, multilayer or hybrid arrangement.

In every possible arrangement of layers in a composite 10 these can be arranged on top of each other through simple lamination. However, the layers can also be firmly joined to each other by joining points 13, whereby a particularly reliable mechanical strength of the composite 10 can be attained.

In FIG. 3 a multilayer arrangement of the composite 10 (multilayer) is illustrated. In this arrangement carrier layers 11 and membrane layers 12 are provided such that they are supported on top of each other in an alternating manner. According to FIG. 3 two carrier layers 11 and two membrane layers 12 are provided. A multilayer arrangement can also have a random number of carrier layers 11 and/or membrane layers 12. It is also possible that, according to requirement, two membrane layers 12 are provided directly on top of each other between two or more carrier layers. Even in the case of a multilayer arrangement the plasma coating can be provided on the microscopic surface of all membrane layers 12 and carrier layers 11 supported on top of each other. Thus, also in a multilayer structure the plasma coating can be provided on internal surfaces of the composite 10.

FIG. 4 shows a variant of the embodiment of the composite 10, in which the membrane 12 is arranged between a first carrier layer 11 and a second carrier layer 15. Basically, the first carrier layer 11 can be designed as a fabric in particular, whereas the second carrier layer 15 differs from the first carrier layer 11 and can be provided as a fleece or nonwoven in particular. By way of such a "hybrid" arrangement properties of different materials can be combined advantageously in the composite, whereby filter, protective properties and acoustic transmission properties can be realized in an advantageous manner in the composite 10. Also in a hybrid arrangement as shown in FIG. 4 a plasma coating can be provided on the entire surface of the composite 10, in which case the plasma polymerization can also take place within the composite 10 in deeper layers such as within pore structures.

The scheme of FIG. 5 shows an example for a manufacturing process for a composite comprising the inventive carrier layer. A collection substrate (top picture) is provided on which the electrospinning membrane is formed (first production step). The electrospinning membrane is formed according to generally known concepts and further described in the following.

In a second step the membrane is transferred and bonded (Bond 1) onto a carrier layer and the original collection substrate on which the electrospinning membrane has been formed can be optionally removed (collection substrate removal). According to the above provided to diagram the carrier layer is a mesh/fabric.

Optionally, their second bonding (Bond 2) can take place after introduction of the second outer layer followed by an optional calender process. Thus, the membrane can be optionally arranged between two equal or different layers forming a sandwich structure. The second outer layer can be provided for example as a mesh, lining or nonwoven material. Finally, a plasma coating is applied to at least one carrier layer and the membrane.

Electrospinning

The processes for making the nanofiber web are illustrated in WO 2006/131081, WO 2008/106903, each incorporated herein by reference in their entirety.

Briefly, in the electrospinning process a high voltage is used to create an electrically charged jet of polymer solution or melt out of the pipette. Before reaching the collecting screen, the solution jet evaporates or solidifies, and is collected as an interconnected web of small fibers. One electrode is placed into the spinning solution/melt and the other attached to the collector. In most cases, the collector is simply grounded. The electric field is subjected to the end of the capillary tube that contains the solution fluid held by its surface tension. This induces a charge on the surface of the liquid. Mutual charge repulsion and the contraction of the surface charges to the counter electrode cause a force directly opposite to the surface tension. As the intensity of the electric field is increased, the hemispherical surface of the fluid at the tip of the capillary tube elongates to form a conical shape known as the Taylor cone. Further increasing the electric field, a critical value is attained with which the repulsive electrostatic force overcomes the surface tension and the charged jet of the fluid is ejected from the tip of the Taylor cone. The discharged polymer solution jet undergoes an instability and elongation process, which allows the jet to become very long and thin. Meanwhile, the solvent evaporates, leaving behind a charged polymer fiber. In the case of the melt the discharged jet solidifies when it travels in the air.

Bonding Methods

There are different bonding techniques available. Hotmelt gravure lamination technology, ultrasonic bonding technology, dipping bonding technology, UFD fiberized spray technology (hotmelt), spun-web bonding technology and thermal bonding technology.

Hotmelt gravure lamination technology is industrially established for in line process. Thus, two steps bonding can also be done in one line for "sandwich" type membrane. It uses a multi-purpose hotmelt laminating and coating system which consists of a gravure roller for dot coating, a revolver dosing head (pos/pos or neg/neg) and application roller and a laminating roller and counter pressure roller.

The gravure roller is used to dot coating with adhesive, whereby two different reactive PU based adhesives (one for PU e-spinning membrane and the other for PA6 membrane) can be used. A high bond strength can be obtained by about 15-25% air permeability loss. The adhesive must be carefully chosen to avoid problems during end application of the membrane (conformity, physical & chemical suitability, medical & food grade etc.). A stiffening of the materials is observed because of adhesives.

The dipping bonding technology (chemical bonding) can be used for the pretreatment of a carrier prior to the electrospinning process, which is sometimes preferable. Also, an additional process step for bonding can be eliminated, which is a major advantage. The two layers laminate can then be used for second bonding e.g. hotmelt, spun-web, UFD etc. to form a multilayer vent.

The UFD is a fiberized spray technology and the most advanced technology for hot melt adhesive applicators. The laminated plate technology (LPT) is applied to produce filament strands of adhesive. Heated air is used to elongate those strands and lay them down in random or ordered patterns. In many cases, by using UFD technology, one can cut adhesive usage by 20-50% without negatively influence the bond strength or durability by high precision application of adhesives. A non-contact mode is available which yields in less chance for damages of e-spun fibers during lamination. The UFD technology is a cleaner process than hotmelt gravure lamination.

The spun-web bonding technology yields rather a three-dimensional structure than a film with a closed surface. The open structure makes the resultant laminate more flexible and high air permeability. Webs are made of different materials: copolyamide, co-polyester, co-polyolefins, polyurethanes etc. The spun-web technology is a very simple process. Three major parameters to be considered during lamination are temperature, pressure and time.

For producing the thermal bonding, it is preferred that a thermal calendaring or a thermal annealing step is performed. These steps can be carried out after the membrane layer(s) are placed on the woven mesh.

For reaching a high quality composite membrane, it is preferred that the first filament woven mesh forms a thermal bonding with the fibers of the membrane. In particular, the woven mesh can comprise two or more filaments being made from or with different polymer materials. At least the material of the first filament of the woven mesh is selected in accordance with the polymer material of the first fiber of the membrane in such a way that the combination of both materials allows establishing a thermal bonding. With a defined distribution of the first filament in the woven mesh are defined pattern of thermal bondings between the woven mesh and the membrane can be achieved. This enables a fine adjustment of the degree or the strength of the thermal bondings between the woven mesh and the membrane.

Optionally, the membrane is made with at least two types of fibers being different in their materials. The first fiber is made from or with a first polymer material, which enables a thermal bonding to a polymeric material of the woven mesh. The bonding between woven mesh and first fiber layer could be established immediately by direct electrospinning of the first fibers and/or the thermal bonding is carried out in a separate step by applying heat and pressure together on the first fibers, second fibers and woven mesh.

As a thermal or welding-like bonding is formed only by a part of the fibers, the number of openings being blocked by melted material is kept low. Thus, a high permeability of the composite membrane can be reached.

Calendering

Calendering is used on materials such as fabric, mesh, laminate vent to obtain a smoother and thinner material, whereby the material is passed between or under rollers at raised temperatures and pressures. The size and shape of the pores can be affected depending on the calendering conditions.

Plasma PECVD

The plasma treatment of textile materials can be applied as textile finishing process for technical and medical textiles as well as for composite materials to improve their surface properties like water and oil repellency. Compared to conventional wetchemical textile finishing, plasma technology shows advantages regarding environmental issues. With the PECVD treatment, e.g. improvement of adhesion characteristics, increasing hydrophilicity, introducing special functional groups on the surface, or modifying the surface morphology can be obtained.

In plasma deposition, which is commonly known as plasma polymerization or PECVD, a very thin polymer layer (nanoscaled) can be deposited on the substrate surface. The layer is formed through polymerization of an organic gas, which is directly polymerized on the substrate surface. In contrast to classical polymerization, plasma polymerization can use every monomer gas or vapour, not limited to their reactivity. The plasma polymer shows unconventional polymerisation behaviour with branched and randomly terminated chains and a high degree of crosslinking.

Based on the invention it is possible to provide a high speed liquid transport through coated filter media like a composite membrane. The inventions also provides a robust and reliable method for manufacturing permanent hydrophilic fabrics and/or composites for hygienic applications such as medical, healthcare, food in a costeffective way

The invention claimed is:

1. A method for producing a polymeric carrier layer with a hydrophilic polymeric nanocoating, comprising:
    producing the hydrophilic polymer nanocoating with a plasma polymerization process by applying organic precursor monomers onto the polymeric carrier layer to produce the polymeric carrier layer comprising filaments of at least one polymeric material,
    wherein
    the plasma polymerization process is performed in a plasma chamber having a plurality of rollers and/or expanders in a roll to roll system, a first electrode set and a second electrode set within the plasma chamber, and
    the polymeric carrier layer is placed between first and second electrodes such that treatment on both sides of the polymeric carrier layer is performed.

2. The method according to claim 1, further comprising:
    producing at least one membrane layer having a pore structure by electrospinning fibers being superimposed, and bonding the carrier layer and the membrane layer together to form a composite membrane,
    wherein the hydrophilic polymer nanocoating is formed with the plasma polymerization process by applying organic precursor monomers onto the polymeric carrier layer and the at least one membrane layer.

3. The method according to the claim 1,
    wherein
    a pre-treatment is performed for a first time period of from about 2 minutes to about 5 minutes, at a first base pressure of from about 70 mTorr to about 150 mTorr, at a first temperature of from about 20° C. up to about 60° C., with a first power output of from about 500 Watts to about 1800 Watts, and
    the hydrophilic polymer nanocoating producing step is performed for a second time period of from about 2 minutes to about 5 minutes, at a second base pressure of from about 15 mTorr to about 100 mTorr, at a second temperature of from about 20° C. up to about 60° C., with a second power output of from about 100 Watts to about 800 Watts.

4. The method according to claim 1,
    further comprising:
    distributing gases and monomer vapor evenly into the plasma chamber with an inlet system over a width of the chamber, the inlet system having mass flow controllers for gases for plasma activation and a monomer vapor supply system for depositing liquid monomer to form the nanocoating.

5. The method according to the claim 1, wherein plasma treatment is performed on the polymeric carrier layer, wherein the nanocoating as a functional layer comprises chemical functional groups selected from the group consisting of hydroxyl groups, carbonyl groups, carboxyl groups, amino groups, and mixtures thereof using monomer vapor consisting of a monomer or a mixture of a monomer and helium or argon.

6. The method according to the claim 1, wherein the nanocoating is deposited in one processing step and/or two processing steps being temporally offset in which first coating step is used as an adhesion layer and second coating step as functional layer having a layer thickness of 10 to 80 nm.

7. The method according to the claim 1, wherein a pre-treatment of the carrier layer is performed using argon, helium, nitrogen and oxygen and combinations thereof prior to deposition of an adhesion layer and/or a functional layer.

8. The method according to the claim 1, wherein the carrier layer are further treated with argon, helium, nitrogen and/or hydrogen, wherein the plasma is temporally offset after each processing step.

9. The method according to the claim 1, wherein the hydrophilic nanocoating is applied in a treatment time of around 4 minutes or less per each processing step on the carrier layer so that resistance against accelerated aging treatments according to ASTM F1980-16 is increased, and liquid transport, wicking and liquid throughput in filtration are improved and/or surface tension with a water contact angle from 0° to 60° is provided.

10. The method according to the claim 1, wherein a woven mesh is used as the carrier layer with filaments of the same polymeric material or with at least two filaments, a first filament being made with a first polymer material and a second filament being made with a second polymer material, which is different from the first polymer material.

11. The method according to claim 10, wherein the woven mesh is weaved with different patterns using the first filament and the second filament, and wherein the first and second filaments can be produced in any cross-sectional shape or geometrical arrangement or pattern.

12. The method according to the claim 1, further comprising:

wherein producing a membrane layer directly onto the carrier layer by electrospinning, and optionally producing another membrane layer on a different carrier substrate by electrospinning, and transferring the another membrane layer onto the carrier layer by a lamination process.

* * * * *